April 30, 1929.  S. LEWIN  1,711,472
GRIDDLE HEATER OR STOVE
Filed June 25, 1928
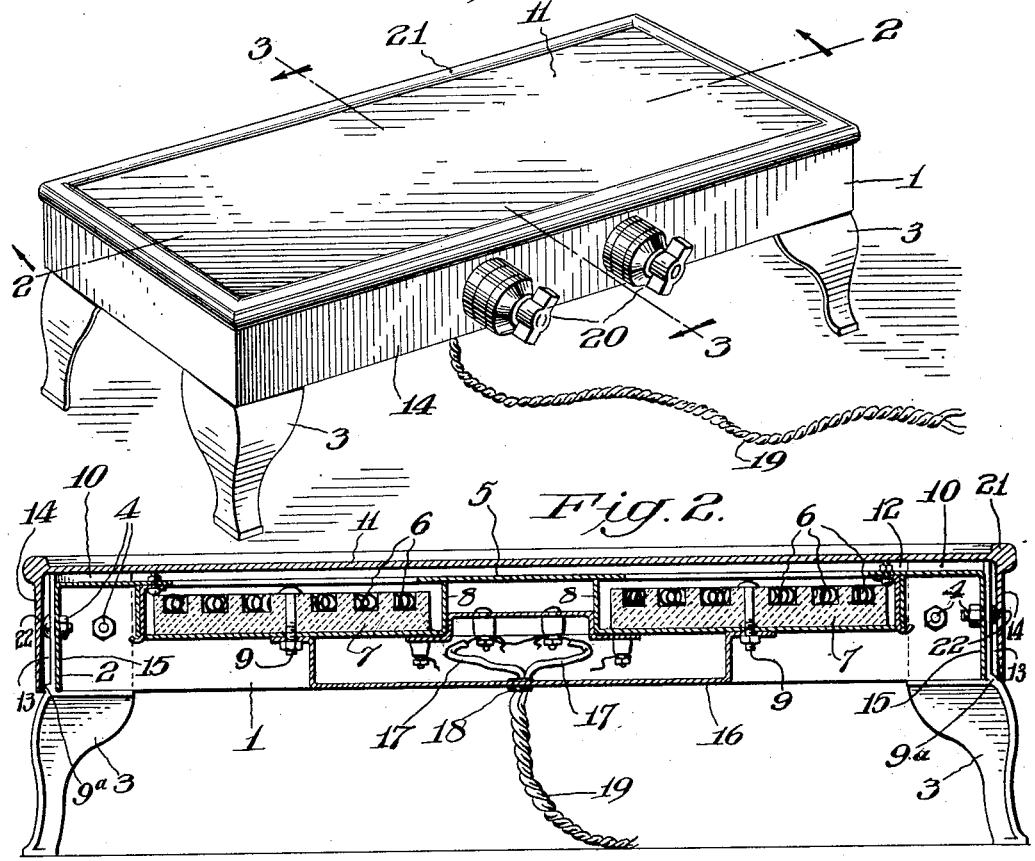

Patented Apr. 30, 1929.

1,711,472

UNITED STATES PATENT OFFICE.

SAMUEL LEWIN, OF PHILADELPHIA, PENNSYLVANIA, ASSIGNOR OF ONE-HALF TO ROBERT A. BOSWELL, OF PHILADELPHIA, PENNSYLVANIA.

GRIDDLE HEATER OR STOVE.

Application filed June 25, 1928. Serial No. 287,973.

The present invention relates to an improved griddle heater or stove especially adapted for making toasted sandwiches.

Toasted sandwiches comprise the upper and lower slices of bread with the required filler between the slices, the remote faces of the bread being toasted.

However other articles of food may be toasted or cooked on the griddle, such as bacon, ham, sausage and the like as well as griddle cakes.

The invention has for its purpose to provide a griddle heater or stove wherein a heater casing may be housed or fitted within a flanged griddle, with the heating elements of the heater substantially immediately under the wall of the griddle, it being possible to use either one or both of the heating elements to heat the wall of the griddle.

Another purpose is to so fit the heater casing within the flanged griddle as to provide for an air space between the sides and top of the heater casing and the walls of the griddle, in order to provide for sufficient circulation of air, and insure a gradual heating of the top wall of the griddle; hence obviating warping of the top wall of the griddle; a reasonable amount of the heated air in this space is allowed to escape and pass off from between the walls of the heater casing and the flanges of the griddle.

Still another purpose is to provide suitable supporting legs to support the heater casing and the griddle, the upper portions of the legs fitting between the heater casing and the marginal flange of the griddle, so as to space the heater casing and the griddle, the upper portion of the legs as well as shoulders on the legs compensating for the space between the upper surface of the heater casing and the griddle.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a perspective view of the griddle heater.

Figure 2 is a sectional view on line 2—2 of Figure 1.

Figure 3 is a cross sectional view on line 3—3 of Figure 1.

Referring to the drawings, 1 identifies a heater frame, which comprises a casing 2 and the legs 3, the latter being bolted to the former as at 4. The casing is open at the bottom, but has a closed top 5 excepting where the heat elements 6 are arranged within porcelain holders 7. The porcelain holders 7 are housed within auxiliary casings 8, there being bolts 9 passing through the porcelain holders and through the center of the auxiliary casings 8 so as to hold the auxiliary and the porcelain holders in position. The porcelain holders are of conventional construction, namely having circular grooves formed therein to receive the heating elements 6, which consist in this instance of resistance coils. It will be noted that the upper parts of the legs 3 project a short distance above the top of the heater casing, and the lower portions of the legs adjacent where they project from the heater casing, are provided with shoulders 9ª. These shoulders and the upper projections 10 of the legs act to limit a griddle 11 in its telescopical position on the heater casing, thereby providing for air spaces 12 and 13 between the top of the heater casing and the top wall of the griddle and the flange 14 of the griddle. The air space 13 is located between the flange 14 and the flange 15 of the heater casing. These air spaces as obvious are in communication, thereby permitting of the circulation of air between the heater casing and the griddle thereby preventing the griddle from overly heating and causing any depression of the griddle surface, on which sandwiches may be toasted. The fact is the generation of heat in these spaces and particularly in the space between the top of the heater casing and the griddle surface or wall creates an attraction of fresh air to be drawn through the space 13 in order to prevent too intense heat in the space 12.

The bolts 9 also act to secure a second auxiliary casing 16 to the first auxiliary casing 8. This second auxiliary casing 16 houses the various wires leading from the heating elements, such wires 17 passing through a suitable porcelain bushing 18, which merge into a single cord 19, which may terminate in the usual plug not shown for an electric socket not shown.

The marginal flange of the griddle is provided with a pair of conventional button switches 20 which may have indicators thereon (variations of degrees of heat not shown), whereby the griddle surface may be heated to various temperatures for toasting sandwiches.

The upper edge of the griddle has a marginal bead 21 which prevents the grease from creeping or feeding off the upper surface of the griddle.

In order to insure against lateral movement of the heater casing and also to insure the space between the flange of the griddle and the flange of the heater casing, the heads of the bolts 4 which secure the legs to the heater casing wedge against the inner surface of the marginal flange of the griddle and thereby insure a tight fit, due to the fact that the inner surface of the marginal flange of the griddle is slightly inclined.

The inner face of the marginal flange of the griddle at points where the bolts 4 occur is provided with depressions 22 in which the heads of the bolts 4 engage, further acting to prevent removal of the toasting griddle.

The inner face of the flange 14 of the griddle is inclined to cause a wedging action.

The invention having been set forth, what is claimed is:

1. In a griddle heater for sandwich toasting, the combination with a heater casing provided with heating elements, of a marginally flanged toasting griddle telescopically fitting over the heater casing and having top and side communicating air spaces between the heater casing and the toasting griddle, and means for spacing the top of the heater casing from the under surface of the toasting wall of the griddle, and means at the sides and ends of the heater casing to insure spacing the sides and ends of the heater casing from the marginal flange of the toasting griddle, thereby causing an air space to be formed to prevent too much heat being transmitted to the griddle.

2. In a griddle heater for sandwich toasting, the combination with a heater casing provided with heating elements, of a marginally flanged toasting griddle telescopically fitting over the heater casing and having top and side communicating air spaces between the heater casing and the toasting griddle, and means for spacing the top of the heater casing from the under surface of the toasting wall of the griddle, thereby causing an air space to be formed to prevent too much heat being transmitted to the griddle and means at the sides and ends of the heater casing to insure spacing the sides and ends of the heater casing from the marginal flange of the toasting griddle, said heater casing having supporting legs, said legs having shoulders on which the marginal flange of the toasting griddle engages.

3. In a griddle heater for sandwich toasting, the combination with a heater casing provided with heating elements, of a toasting griddle marginally flanged and telescopically fitting over the heater casing, and means operatively associated between the top, sides and ends of the heater casing and the inner surface of the griddle top and its marginal flange, thereby uniformly separating the heater casing and griddle, causing to form between the sides, ends, and top of both the flanged griddle and the heater casing, an unbroken air space thereby unifying circulation of air and preventing excessive heat being transmitted to the griddle top.

4. In a griddle heater for sandwich toasting, the combination with a heater casing provided with heating elements, of a toasting griddle marginally flanged and telescopically fitting over the heater casing, and means operatively associated between the top, sides and ends of the heater casing and the inner surface of the griddle top and its marginal flange, thereby uniformly separating the heater casing and griddle, causing to form an unbroken air space between the heater casing and the inner surface of the flanged griddle, said unbroken air space opening and discharging at a point marginally adjacent the lower edge of the flanged griddle, thereby unifying circulation of the air and preventing excessive heat being transmitted to the griddle top.

In witness whereof, the inventor's signature is hereunto affixed.

SAMUEL LEWIN.